US008875265B2

(12) United States Patent
Palanigounder

(10) Patent No.: US 8,875,265 B2
(45) Date of Patent: Oct. 28, 2014

(54) SYSTEMS AND METHODS FOR REMOTE CREDENTIALS MANAGEMENT

(71) Applicant: Qualcomm Incorporated, San Diego, CA (US)

(72) Inventor: Anand Palanigounder, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 44 days.

(21) Appl. No.: 13/750,816

(22) Filed: Jan. 25, 2013

(65) Prior Publication Data

US 2013/0305330 A1 Nov. 14, 2013

Related U.S. Application Data

(60) Provisional application No. 61/646,792, filed on May 14, 2012.

(51) Int. Cl.
H04W 12/06 (2009.01)
H04L 29/06 (2006.01)
H04W 8/20 (2009.01)
H04W 12/04 (2009.01)
H04W 4/00 (2009.01)

(52) U.S. Cl.
CPC ............. *H04W 12/06* (2013.01); *H04L 63/062* (2013.01); *H04L 63/0876* (2013.01); *H04W 8/205* (2013.01); *H04W 12/04* (2013.01); *H04W 4/005* (2013.01)
USPC .......................................................... 726/6

(58) Field of Classification Search
USPC .......................................................... 726/6
See application file for complete search history.

(56) References Cited

U.S. PATENT DOCUMENTS 7,260,724 B1 * 8/2007 Dickinson et al. ............ 713/182
7,290,288 B2 * 10/2007 Gregg et al. ..................... 726/28
(Continued)

FOREIGN PATENT DOCUMENTS

WO    2009103621 A1    8/2009
WO    2011115407 A2    9/2011
(Continued)

OTHER PUBLICATIONS

3rd Generation Partnership Project; Technical Specification Group Services and System Aspects; Feasibility study on the security aspects, of remote provisioning and change of subscription for Machine to Machine (M2M) equipment (Release 9 ) , 3GPP Standard; 3GPP TR 33.812, 3rd Generation Partnership Project (3GPP), Mobile Competence Centre ; 650, Route Des Lucioles.;. F-06921 Sophia-Antipolis Cedex- ; France, No. V9.2.0, Jun. 22, 2010, pp. 1-87, XP050441986, [retrieved-on Jun. 22, 2010].

(Continued)

*Primary Examiner* — Tu Nguyen
(74) *Attorney, Agent, or Firm* — Abdollah Katbab

(57) ABSTRACT

The present application relates generally to wireless communication systems and more specifically to systems, methods, and devices for remote credentials management within wireless communication systems. In one aspect, a method of obtaining provisioning information via a service provider network, such as a cellular network, for a device is provided. The method includes transmitting an attach request via the service provider network for provisioning service, the attach request including device vendor information which includes a unique identifier for the device. The method further includes receiving provisioning information from the service provider upon authentication of the device vendor information. In other aspects, systems and methods for providing provisioning information are described.

42 Claims, 8 Drawing Sheets

(56) References Cited

U.S. PATENT DOCUMENTS

| | | |
|---|---|---|
| 2009/0239503 A1 | 9/2009 | Smeets |
| 2010/0197274 A1 | 8/2010 | Ahmavaara |
| 2011/0040933 A1 | 2/2011 | Swindell |
| 2011/0314287 A1 | 12/2011 | Escott et al. |
| 2012/0054839 A1 | 3/2012 | Friedlander et al. |
| 2012/0300932 A1 | 11/2012 | Cambridge et al. |

FOREIGN PATENT DOCUMENTS

| | | |
|---|---|---|
| WO | 2011159952 A1 | 12/2011 |
| WO | 2013039900 A1 | 3/2013 |

OTHER PUBLICATIONS

BT, et al., "Introducing term MCIM to TR 33.812", 3GPP Draft; S3-090164-PCRTOTR33812- MCIM_FIN, 3rd Generation Partnership Project (3GPP), Mobile Competence Centre ; 650, Route Des Lucioles ; F-06921 Sophia-Antipolis Cedex ; France, No. Florence; 20090112, Jan. 12, 2009, XP050334819, [retrieved on Jan. 12, 2009] sections 1, 3.1 p. 15, line 19 -line 20 section 5.2.2.3.2.2 section 5.2.2.3.2.4 section 5.2.2.4.1 section 5.2.2.4.4 section 5.2.2.6.1 section 5.2.2.6.3.1.
International Search Report and Written Opinion—PCT/US2013/040811—ISA/EPO—Jul. 26, 2013.

\* cited by examiner

SYSTEMS AND METHODS FOR REMOTE CREDENTIALS MANAGEMENT

CROSS REFERENCE TO RELATED APPLICATION

This application claims benefit of priority under 35 U.S.C. §119(e) to U.S. Provisional Patent Application 61/646,792 entitled "SYSTEMS AND METHODS FOR REMOTE CREDENTIALS MANAGEMENT" filed on May 14, 2012, the disclosure of which is hereby incorporated by reference in its entirety.

BACKGROUND

1. Field

The present application relates generally to wireless communication systems and more specifically to systems, methods, and devices for remote credentials management within wireless communication systems.

2. Background

In many telecommunication systems, communications networks may be used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Before a device may begin using a network, the device may need to provide information to the network identifying the device and, in some instances, associated subscription information. The subscription information may include service level, available network services, and other features that may be used by the device. In some implementations, the device identifier may be sufficient to identify associated subscription information.

For example, to obtain cellular service from an operators of a user's choice, cellular consumer electronics (e.g., tablets, Smartphones, feature phones, cameras) or machine to machine (M2M) devices (e.g., smart utility meters, sensors, vehicle assistance devices) typically require the user either to buy a SIM card from the operator and install them on or in the device. Alternatively, the devices may come preinstalled with subscription credentials (e.g., on a smartcard or in the memory of the device) of the operator that the user desires to get the service. The former may be expensive to the operator (e.g., due to distribution channel complexities). The former may also be inconvenient to the user. For example, if the device is a smart energy meter, the SIM card would need to be secured to avoid theft. The latter may tie the device to a particular operator. This can make it expensive for the device vendor because different models would be manufactured for each operator (e.g., multiple SKUs per operator, per country, etc.). Furthermore, the latter may limit the user's choices as certain devices may be provided for a limited number of operators.

One way to solve the problem is to configure the device remotely using an existing subscription on the device (e.g., on the smartcard or on the device itself) to download the credentials. Alternatively, an existing subscription associated with another form of out-of-band connectivity (e.g., WLAN) may be used to download the credentials. However, if the device does not support another form of out of band connectivity (e.g., lacks WLAN capability or WLAN is not available to the device) and/or no subscriptions credentials are available to the device, it is still desirable to provide a method for these virgin devices to be provisioned using a cellular network.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include fast initial network link setup wireless communication systems for access points and devices.

In one innovative aspect, a method of obtaining provisioning information via a service provider network for a device is provided. The method includes transmitting, via the service provider network, an attach request for provisioning service, the attach request including device vendor information having a unique identifier for the device. The method also includes receiving provisioning information from the service provider network upon authentication of the device vendor information.

In a further innovative aspect, an apparatus for obtaining provisioning information via a service provider network is provided. The apparatus includes an attachment manager configured to transmit, via the service provider network, an attach request for provisioning service, the attach request including device vendor information having a unique identifier for the apparatus. The apparatus includes a credential manager configured to receive provisioning information from the service provider network upon authentication of the device vendor information.

In one innovative aspect, another apparatus for obtaining provisioning information via a service provider network is provided. The apparatus includes means for transmitting, via the service provider network, an attach request for provisioning service, the attach request including device vendor information having a unique identifier for the apparatus. The apparatus includes means for receiving provisioning information from the service provider network upon authentication of the device vendor information.

A computer readable storage medium comprising instructions executable by a processor of an apparatus is provided in a further innovative aspect. The instructions cause the apparatus to transmit, via the service provider network, an attach request for provisioning service, the attach request including device vendor information having a unique identifier for the apparatus. The instructions also cause the apparatus to receive provisioning information from the service provider network upon authentication of the device vendor information.

In a further innovative aspect, a method of providing provisioning information via a service provider network to a device is provided. The method includes receiving an attach request from the device via the service provider network for provisioning service, the attach request including device vendor information having a unique identifier for the device. The method includes authenticating the device based at least in part on device vendor information. The method includes transmitting provisioning information associated with a subscription upon determining the device is authenticated.

In another innovative aspect, an apparatus for providing provisioning information via a service provider network to a device is provided. The apparatus includes an attachment manager configured to receive an attach request from the device via the service provider network for provisioning service, the attach request including device vendor information having a unique identifier for the device. The apparatus includes an authenticator configured to authenticate the device based at least in part on the device vendor information. The apparatus includes a credential manager configured to cause the transmission of provisioning information associated with a subscription upon determining the device is authenticated.

A further innovative apparatus for providing provisioning information via a service provider network for a device is described. The apparatus includes means for receiving an attach request from the device via the service provider network for provisioning service, the attach request including device vendor information having a unique identifier for the device. The apparatus includes means for authenticating the device based at least in part on device vendor information. The apparatus also includes means for transmitting provisioning information associated with a subscription upon determining the device is authenticated.

In a further innovative aspect, another computer readable storage medium comprising instructions executable by a processor of an apparatus is provided. The instructions cause the apparatus to receive an attach request from a device via the service provider network for provisioning service, the attach request including device vendor information having a unique identifier for the device. The instructions cause the apparatus to authenticate the device based at least in part on device vendor information. The instructions cause the apparatus to transmit provisioning information associated with a subscription upon determining the device is authenticated.

In one or more of the above aspects, the attach request may include a provisioning type. For example, the provisioning type may be included in the attach request in an information element.

In some implementations the methods, apparatus, or instructions may include or be configured to communicate (e.g., transmit and/or receive) a challenge request to authenticate the device vendor information and to communicate (e.g., transmit and/or receive) a challenge response based at least in part on device vendor information. In some implementations, a determination may be made regarding whether the challenge response is associated with a subscription. The determination may be based on device vendor information.

Alternatively or in addition, the methods, apparatus, or instructions may include or be configured to communicate (e.g., transmit and/or receive) a request for subscription authentication and communicate (e.g., transmit and/or receive) a challenge response based at least in part on a predetermined credential shared by multiple devices.

In some implementations, a session key may be obtained. The session key may be based at least in part on the device vendor information. Communications between the device and the service provider network may be secured based at least in part on the session key. Upon receipt of the provisioning information, the device may be configured to detach from the service provider network and obtain service based at least in part on the received provisioning information. In some implementations, the service provider network may be configured to initiate the detach upon transmission of the provisioning information.

In one or more of the above aspects, the device vendor information may include an encryption certificate associated with a vendor of a device. The unique identifier for the device may include an international mobile equipment identifier and/or a mobile equipment identifier. The service provider network discussed above may include a cellular network.

In some implementations, upon determining the device is unauthenticated, the methods, apparatus, or instructions described may include or be configured to obtain a subscription offer from a credential provider, transmit the subscription offer to the device, receive a message indicating acceptance of the subscription offer, and transmit provisioning information based on the accepted subscription offer.

DETAILED DESCRIPTION

Figure 1:
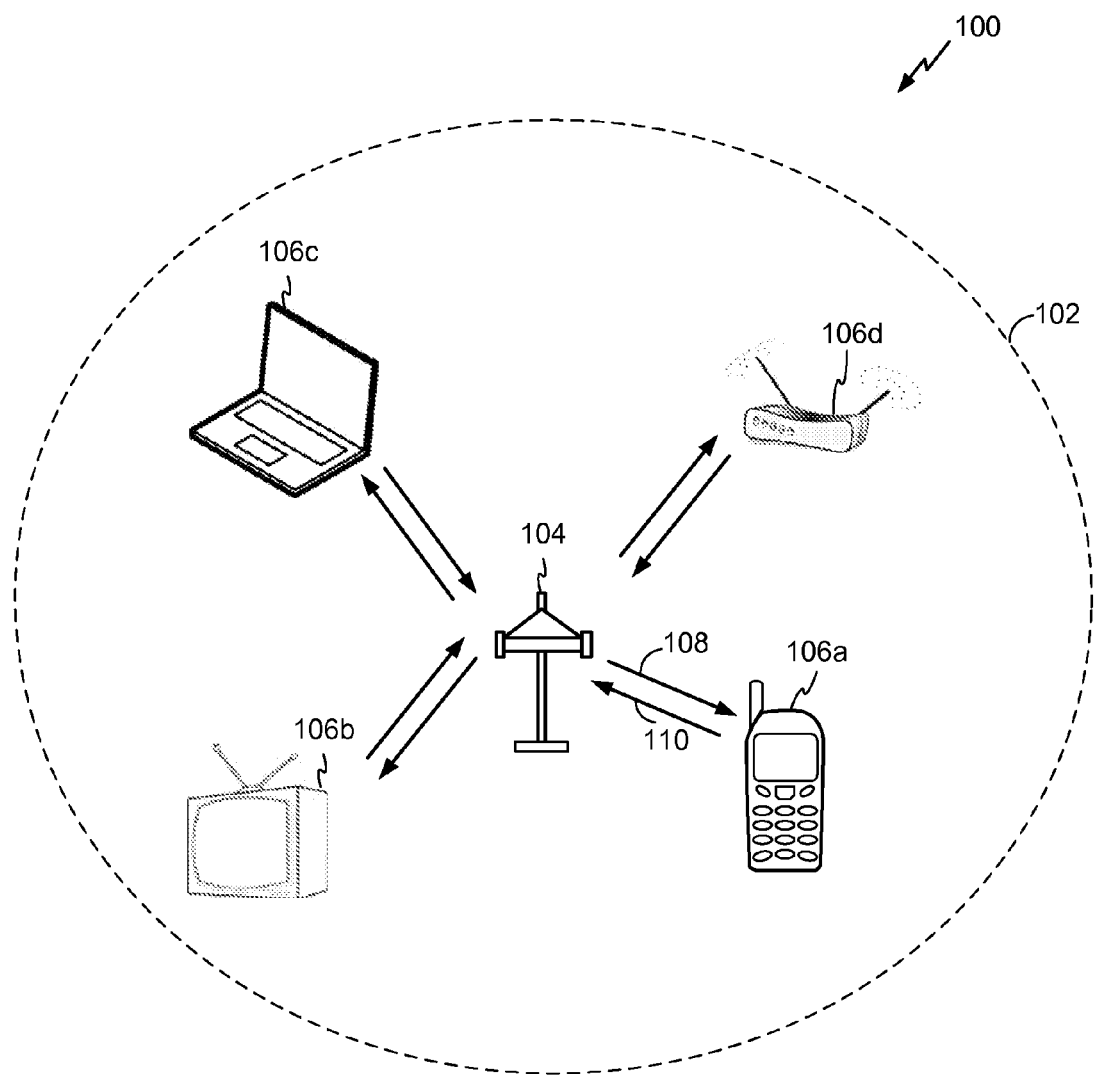
FIG. 1 shows an example of a wireless communication system in which aspects of the present disclosure may be employed.

Systems and methods to provision cellular devices with cellular credentials (Remote Credentials Management) over cellular network (e.g., UMTS, LTE, 1x, DO) are described. Such systems and methods allow a cellular device lacking credentials and out of band connectivity to access a cellular network to provision credentials which may be used to access a cellular network. In some systems, the described systems and methods of providing provisioning information for a service may be referred to as remote credentials management.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The systems and methods described herein may be applied for remote credential management in LTE, UMTS, HRPD, evolved HRPD (eHRPD), or CDMA (e.g., CDMA 1x) based networks.

In some aspects, wireless signals in a sub-gigahertz band may be transmitted. Transmission may use orthogonal frequency-division multiplexing (OFDM), direct-sequence spread spectrum (DSSS) communications, a combination of OFDM and DSSS communications, or other schemes. Sub-gigahertz protocols may be used for sensors, metering, and smart grid networks. Aspects of certain devices implementing such protocols may consume less power than devices implementing other wireless protocols. These devices may be used to transmit wireless signals across a relatively long range, for example about one kilometer or longer.

In some implementations, a wireless network may include various devices which are the components that access the wireless network. For example, there may be two types of devices: access points (APs) and clients (also referred to as stations, or STAs). In general, an AP serves as a hub or base station for the wireless network and an STA serves as a user of the wireless network. For example, an STA may be a laptop computer, a personal digital assistant (PDA), a mobile phone, etc. In an example, an STA connects to an AP via a cellular wireless link to obtain general connectivity to the Internet or to other wide area networks. In some implementations an STA may also be used as an AP.

An access point (AP) may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, or some other terminology.

A station "STA" may also comprise, be implemented as, or be known as an access terminal (AT), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

FIG. 1 shows an exemplary wireless communication system. The wireless communication system 100 may include an AP 104, which communicates with STAs such as a mobile phone 106a, a television 106b, a computer 106c, or another access point 106d (individually or collectively hereinafter identified by 106).

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may provide wireless communication coverage in a basic service area (BSA) 102. The AP 104 along with the STAs 106 associated with the AP 104 and that are configured to use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
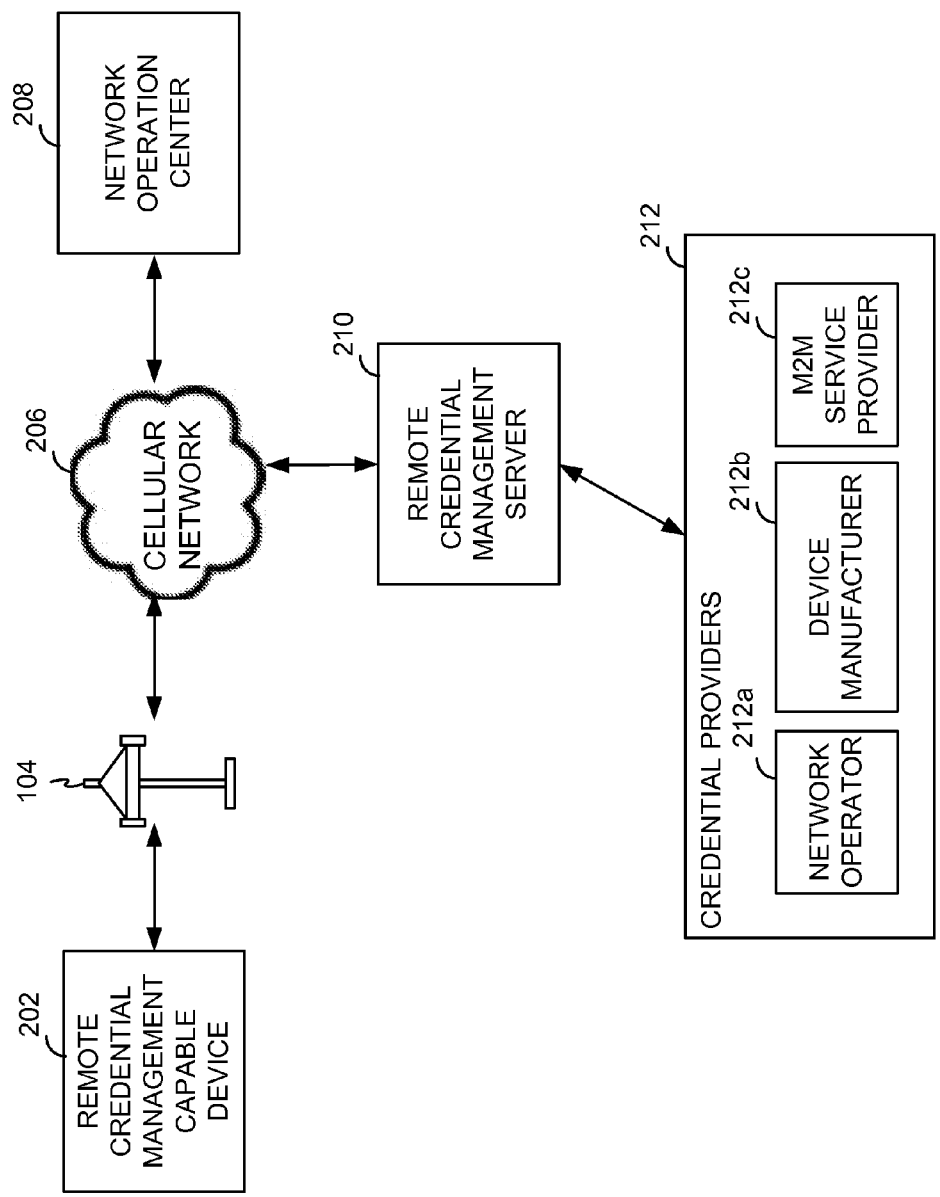
FIG. 2 shows another example of a wireless communication system in which aspects of the present disclosure may be employed.

FIG. 2 shows another example of a wireless communication system in which aspects of the present disclosure may be employed. The wireless communication system shown in FIG. 2 includes a remote credential management capable device 202. A remote credential management capable device 202 may include a smart phone, a feature phone, a cellular device included in a car, a sensor such as a temperature gauge or a seismograph, a camera, a tablet computer, an electronic book (e-book) reader, a credit card reader, or other device configured for wireless communication. The remote credential management capable device 202 may be an STA 106. However, not all STAs may be remote credential management capable devices 202.

As described above, the remote credential management capable device 202 may communicate with an access point 104. The access point 104 may be configured to provide access to a cellular network 206. The cellular network 206 may include one or more gateways which are configured to provide access to data networks.

Directly or via the data network, the cellular network 206 may be configured to communicate with a remote credential management server 210. The remote credential management server 210 may be located on an operator's network. For example the remote credential management server 210 may be included in a provisioning and device management system. In some implementations, the remote credential management server 210 may be hosted by a machine to machine service provider on behalf of the network operator. In some implementations, the remote credential management server 210 may be hosted by a device vendor on behalf of the network operator.

The remote credential management server 210 may be configured to manage remote credential management capable devices. The remote management credential server 210 may be configured to manage subscription to device mappings. This mapping may be used for provisioning of subscription credentials and/or billing purposes. The remote credential management server 210 may support an interface to external service providers for registering devices and associating billing plans.

The service providers (e.g., utility company or ebook seller) may also be credential providers 212. In some implementations, the credential providers 212 may not provide network services beyond providing credentials. For example, a credential provider 212 may purchase network services in bulk from an operator and resell these services. As another example, a credential provider 212 may offer credentials if users provide information (e.g., take a survey, view content, etc.). The credential providers 212 may be located within the service provider network or attached to the service provider network.

One example of a credential provider is a network operator 212a. Another example of a credential provider is a device manufacturer 212b. Another example of a credential provider 212 is a machine to machine service provider 212c. The credential providers may manage remote credential management capable devices 202 by providing device identifiers, identifiers for classes of devices, and/or certificates for authenticating remote credential management capable devices.

The system may also include a network operations center 208. The network operations center 208 may be configured to manage back-office features related to subscription credentials. For example, if a credential provider 212 is subsidizing the access for a remote credential management capable device 202, the network operations center 208 may monitor traffic from the device and determine whether the service requested by the remote credential management capable device 202 is within the negotiated service level associated with the credential provider. The network operations center 208 may be configured to also apply policy and charging functions as well as quality of service for the remote credential management capable device 202.

Figure 3:
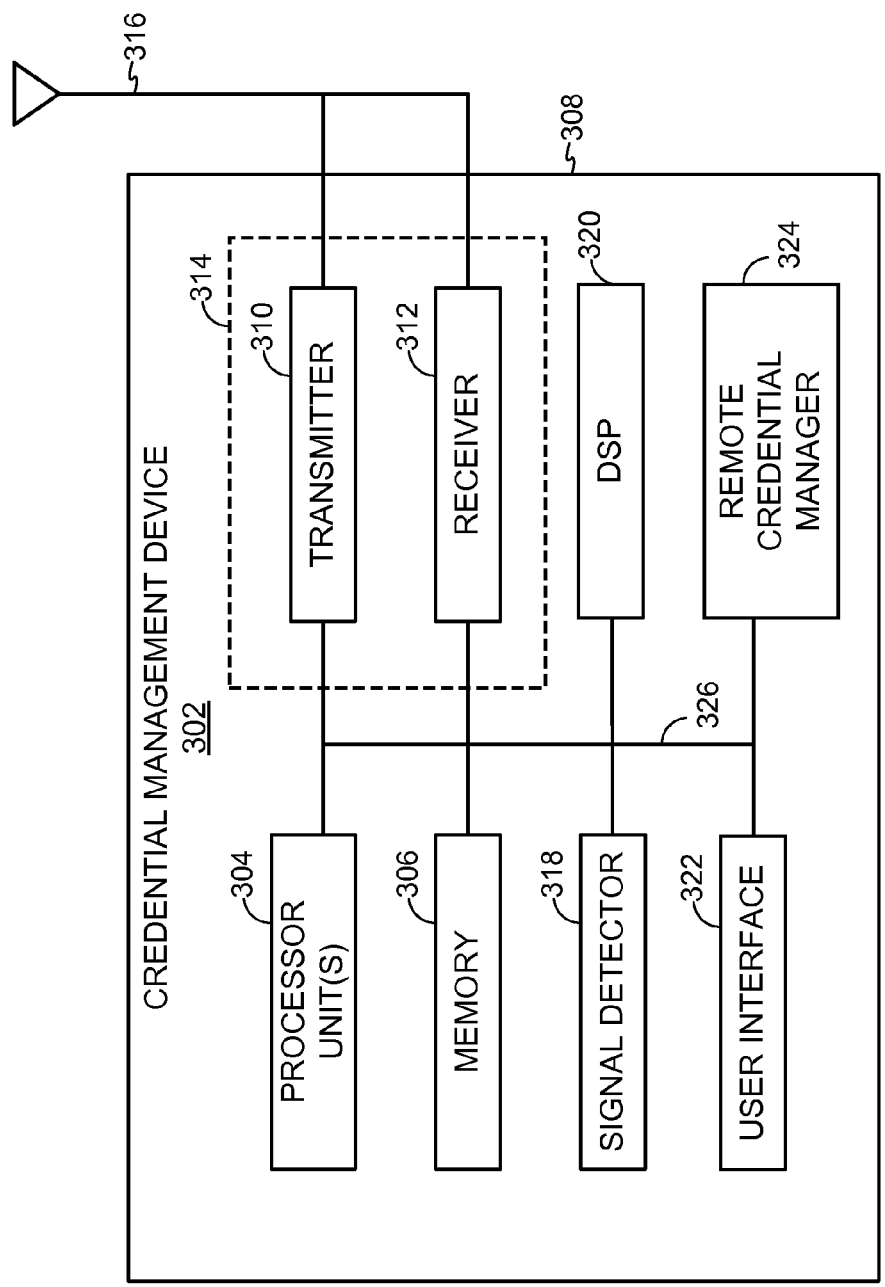
FIG. 3 shows a functional block diagram of an example of a wireless device that may be employed within the wireless communication system of FIG. 1.

FIG. 3 shows a functional block diagram of an exemplary a credential management device that may be employed within the wireless communication system of FIG. 1. The credential management device 302 is an example of a device that may be configured to implement the various methods described herein. For example, the credential management device 302 may comprise the remote credential management capable device 202 or the remote credential management server 210.

The credential management device 302 may include processor unit(s) 304 which controls operation of the credential management device 302. One or more of the processor unit(s) 304 may be collectively referred to as a central processing unit (CPU). Memory 306, which may include both read-only memory (ROM) and random access memory (RAM), provides instructions and data to the processor units 304. A portion of the memory 306 may also include non-volatile random access memory (NVRAM). The processor unit(s) 304 may be configured to perform logical and arithmetic operations based on program instructions stored within the memory 306. The instructions in the memory 306 may be executable to implement the methods described herein.

The processor unit(s) 304 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In an implementation where the processor unit(s) 304 comprises a DSP, the DSP may be configured to generate a packet (e.g., a data packet) for transmission. In some aspects, the packet may comprise a physical layer data unit (PPDU).

The credential management device 302 may also include machine-readable media for storing software. The processing unit(s) 304 may comprise one or more machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor unit(s) 304, cause the credential management device 302 to perform the various functions described herein.

The credential management device 302 may include a transmitter 310 and/or a receiver 312 to allow transmission and reception, respectively, of data between the credential management device 302 and a remote location. The transmitter 310 and receiver 312 may be combined into a transceiver 314. An antenna 316 may be attached to the housing 308 and electrically coupled with the transceiver 314. The credential management device 302 may also include (not shown) multiple transmitters, multiple receivers, multiple transceivers, and/or multiple antennas.

The transmitter 310 may be configured to wirelessly transmit packets and/or signals. For example, the transmitter 310 may be configured to transmit different types of packets generated by the processor unit(s) 304, discussed above. The packets are made available to the transmitter 301. For example, the processor unit(s) 304 may store a packet in the memory 306 and the transmitter 301 may be configured to retrieve the packet. Once the transmitter retrieves the packet, the transmitter 301 transmits the packet via the antenna 316.

An antenna 316 on the credential management device 302 may detect wirelessly transmitted packets/signals. The receiver 312 may be configured to process the detected packets/signals and make them available to the processor unit(s)

304. For example, the receiver 312 may store the packet in memory 306 and the processor unit(s) 304 may be configured to retrieve the packet.

The credential management device 302 may also include a signal detector 318 that may be used in an effort to detect and quantify the level of signals received by the transceiver 314. The signal detector 318 may detect such signals as total energy, energy per subcarrier per symbol, power spectral density, and other signals. The credential management device 302 may also include a digital signal processor (DSP) 320 for use in processing signals. The DSP 320 may be configured to generate a packet for transmission. In some aspects, the packet may comprise a physical layer data unit (PPDU).

The credential management device 302 may further comprise a user interface 322 in some aspects. The user interface 322 may comprise a keypad, a microphone, a speaker, and/or a display. The user interface 322 may include any element or component that conveys information to a user of the credential management device 302 and/or receives input from the user. The credential management device 302 may also include a housing 308 surrounding one or more of the components included in the credential management device 302.

The credential management device 302 may also include a remote credential manager 324. When the credential management device 302 is implemented as a remote credential management capable device 202 (e.g., a STA), the remote credential manager 324 may include one or more circuits configured to generate a provisioning attachment request including the bootstrap information to obtain subscription credentials, receive and respond to challenge requests, and manage provided subscription credentials as described in further detail below. When the credential management device 302 is implemented as a remote credential management server 210, the remote credential manager 324 may include one or more circuits configured to process provisioning attachment requests including bootstrap information, to perform device authentication challenge messaging, and identify and provide subscription credentials, as described in further detail below.

The various components of the credential management device 302 may be coupled together by a bus system 326. The bus system 326 may include a data bus, for example, as well as a power bus, a control signal bus, and a status signal bus in addition to the data bus. Those of skill in the art will appreciate the components of the credential management device 302 may be coupled together or accept or provide inputs to each other using some other mechanism.

Although a number of separate components are illustrated in FIG. 3, those of skill in the art will recognize that one or more of the components may be combined or commonly implemented. For example, the processor unit(s) 304 may be used to implement not only the functionality described above with respect to the processor unit(s) 304, but also to implement the functionality described above with respect to the signal detector 318. Further, each of the components illustrated in FIG. 3 may be implemented using a plurality of separate elements.

Figure 4:
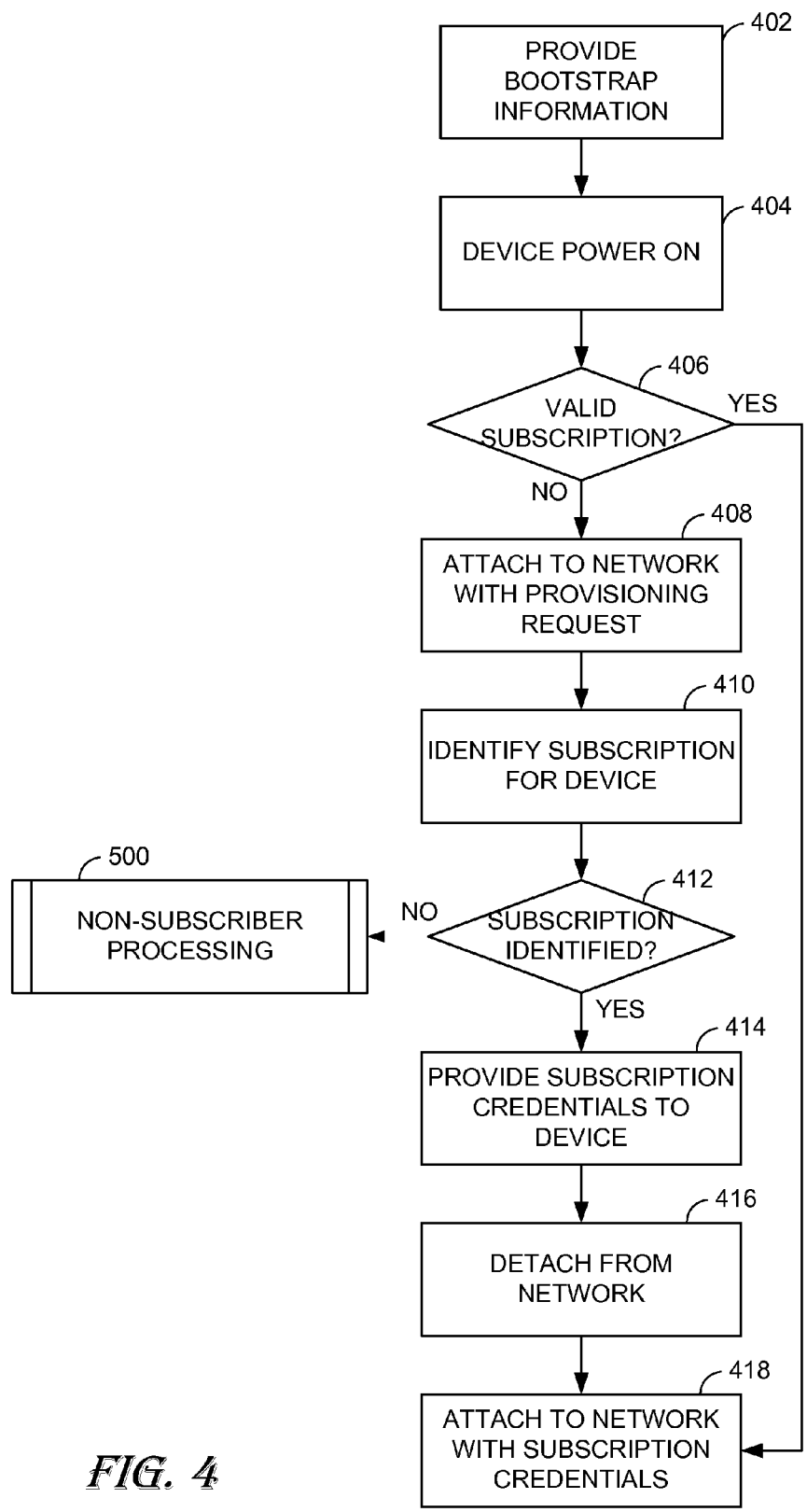
FIG. 4 shows a process flow diagram of an example of a process for remote credential management.

FIG. 4 shows a process flow diagram of an example of a process for remote credential management. The process shown in FIG. 4 may be implemented by one or more elements included in a wireless network such as that shown in FIG. 1 or 2. At block 402, bootstrap information may be provided. The bootstrap information may generally refer to information provided by a module/device vendor. The information may be installed in the module/device for accessing a wireless network. The bootstrap information may be based on network operator requirements. For example, one network operator may bootstrap based on the international mobile equipment identifier (IMEI) and a certificate or a private/public key pair associated with the IMEI while another network operator may bootstrap based on the IMEI, a certificate or private/public key pair(s) associated with the IMEI, and a service provider identifier. In some implementations, a mobile equipment identifier (MEID) may be used to identify a device. Accordingly, a module/device may include several pieces of bootstrap information which may or may not be used to provision credentials based on the network operator.

The bootstrap information, in some implementations, may include an international mobile equipment identifier, mobile equipment identifier, and/or an international mobile equipment identifier certificate. The bootstrap information elements may be securely configured at manufacturing. For example, the elements may be stored in a static and/or secure memory location on the device. In some implementations, it may be desirable for the international mobile equipment identifier certificate to be issued by an operator trusted certificate authority. The bootstrap information may be stored in a memory of the device. The bootstrap information may be stored in a removable memory such as a smartcard which may be coupled with the device.

At block 404, the device may be powered on. At decision block 406, a determination may be made as to whether a valid subscription is available for the device. For example, cellular subscription credentials may be included on a smart card or in memory of the device.

If the device includes valid subscription credentials, these credentials may be used to attach to the network at block 418 using attachment procedures prescribed by the network operator or a standard governing the wireless network. However, if the determination at decision block 406 does not identify a valid subscription for the device, at block 408 the device may be configured to attach to the network using a provisioning attachment request. In some implementations, an attachment request may include an attachment type field. In such implementations, the attachment type may be identified as provisioning or provisioning service. The network may be configured to allow this device to attach for the limited purposes of obtaining subscription credentials. One way the network may determine this attachment is for this limited purpose may be through the use of an attachment type field.

At block 410, based on the provisioning service request, the network may identify subscription information for the device. As part of identifying subscription information, the network may perform authentication based in the bootstrap information included in the provisioning service request. In some implementations, the authentication may include further messaging (e.g., challenge request/response) to obtain information for authentication.

In some implementations the network may omit authentication and key agreement (AKA) authentication for provisioning attachment requests. In such implementations, non-access stratum security context such as $K_{ASME}$ may be derived from the IMEI authentication. In some implementations, AKA authentication may be performed using a well-known set of credentials. The well-known AKA credentials, along with credentials from IMEI authentication, may be used as a "guest" credential to allow AKA secured communications with the device during the provisioning process. The well-known AKA credentials may be predetermined and shared by multiple devices. The well-known credentials may be a temporary IMSI, a temporary mobile subscriber identity (TMSI), a global unique temporary identifier (GUTI), or a similar identifier. This identifier may be used for the purpose of provisioning devices that may not have a valid subscription.

If authentication based on the bootstrap information succeeds, the network may consider the device as being provided by an operator authorized and/or certified vendor. In some implementations, this device may be termed a "trusted" device for provisioning purposes. In so identifying the device, a corresponding subscription may be identified at block 410. As part of the identification, the remote credential management server 210 may securely obtain the subscription information for the device.

At decision block 412, a determination as to whether subscription information is identified for the device is performed. The determination may be based on the result of the authentication. The determination may be based on an authenticated device which does not have an active subscription. For example a device may have a monthly subscription with a service provider. At the end of the month, the subscription may end. As such, the device may need to renew its subscription to obtain access to the service.

If a subscription is identified for the device, at block 414, the identified subscription credentials may be provided to the device. The credentials may also be provided to one or more elements of the network such as to network entities configured to perform 3GPP authentication. The network entities may include a home subscriber server (HSS) or authentication, authorization and access (AAA) server coupled with the service provider network.

At block 416, the device may detach from the network. Because the device was previously attached in a provisioning only mode, the network resources available to the device may have been limited to only provisioning credentials services. The network may include IP filters to limit data traffic, for example. At block 418, the device may attach to the network using the provided credentials.

Returning to decision block 412, if a valid subscription is not identified for the device, additional non-subscriber processing may be performed at block 500. The additional non-subscriber processing will be described in further detail in reference to FIG. 5 below.

Figure 5:
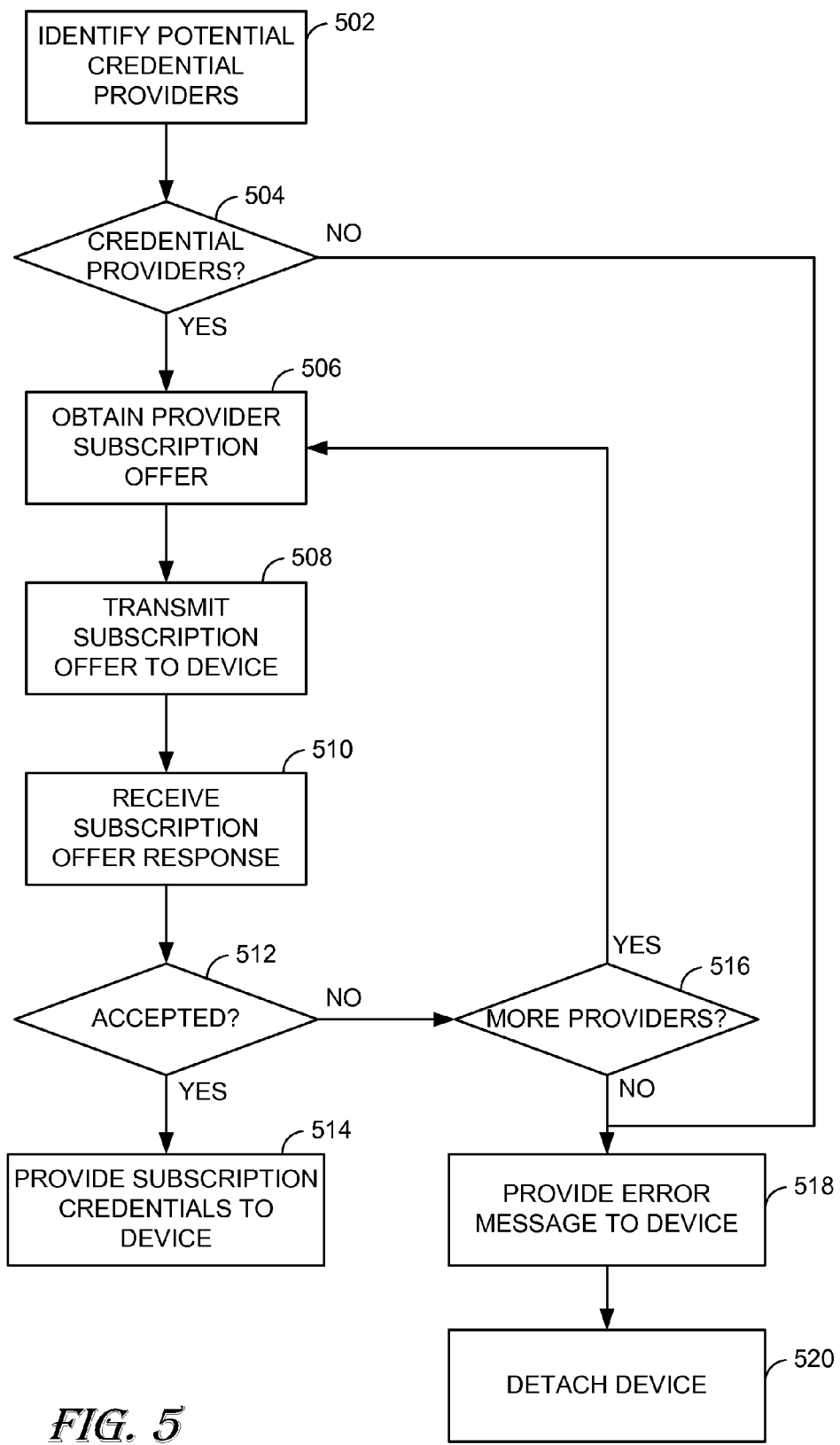
FIG. 5 shows a process flow diagram of an example of a process for non-subscriber processing during remote credential management.

FIG. 5 shows a process flow diagram of an example of a process for non-subscriber processing during remote credential management. The process for non-subscriber processing may be performed for authenticated devices. In such instances, the device may be identified and associated with one or more credential providers 212. However, the device may not have an active valid credential for any one provider. The process may begin at block 502 where potential credential providers are identified. A remote credential management server may be queried using one or more elements of the bootstrap information to identify potential credential providers 212.

At decision block 504, a determination is made as to whether any credential providers 212 are available for the identified device. If no credential providers 212 are found for the device, the process continues to block 518. At block 518, an error message may be provided to the device indicating no credential providers 212 are available for provisioning subscription information. The flow may finish at block 520 with the device detaching from the network. The detachment may be performed by the network and/or the device.

Returning to decision block 504, if one or more credential providers 212 are identified for the device, the process continues to block 506 where the provider subscription offer is obtained. A provider subscription offer may generally refer to conditions and or terms for obtaining a subscription credential from the provider. For example, the offer may include providing payment information for a subscription credential. The offer may include requesting a key value for a subscription credential. The key value may be provided out of band, such as on a receipt for a purchase.

At block 508 the subscription offer may be transmitted to the device. The transmission may cause an interface to display the offer information for example via a web browser. At block 510, a response to the subscription offer may be received. At decision block 512, a determination is made as to whether the offer has been accepted. The acceptance determination may include providing the response to the subscription offer to be credential provider for verification, validation, and/or further processing. If the offer is accepted, the credentials may be provided to the device. The process may continue as, for example, in FIG. 4 at block 416.

If the offer is not accepted, at decision block 516, a determination is made as to whether any additional credential providers 212 have been identified for the device. If no additional credential providers 212 have been identified, the process continues to block 518 as described above. If additional credential providers 212 have been identified, the process continues to block 506 as described above.

Figure 6:
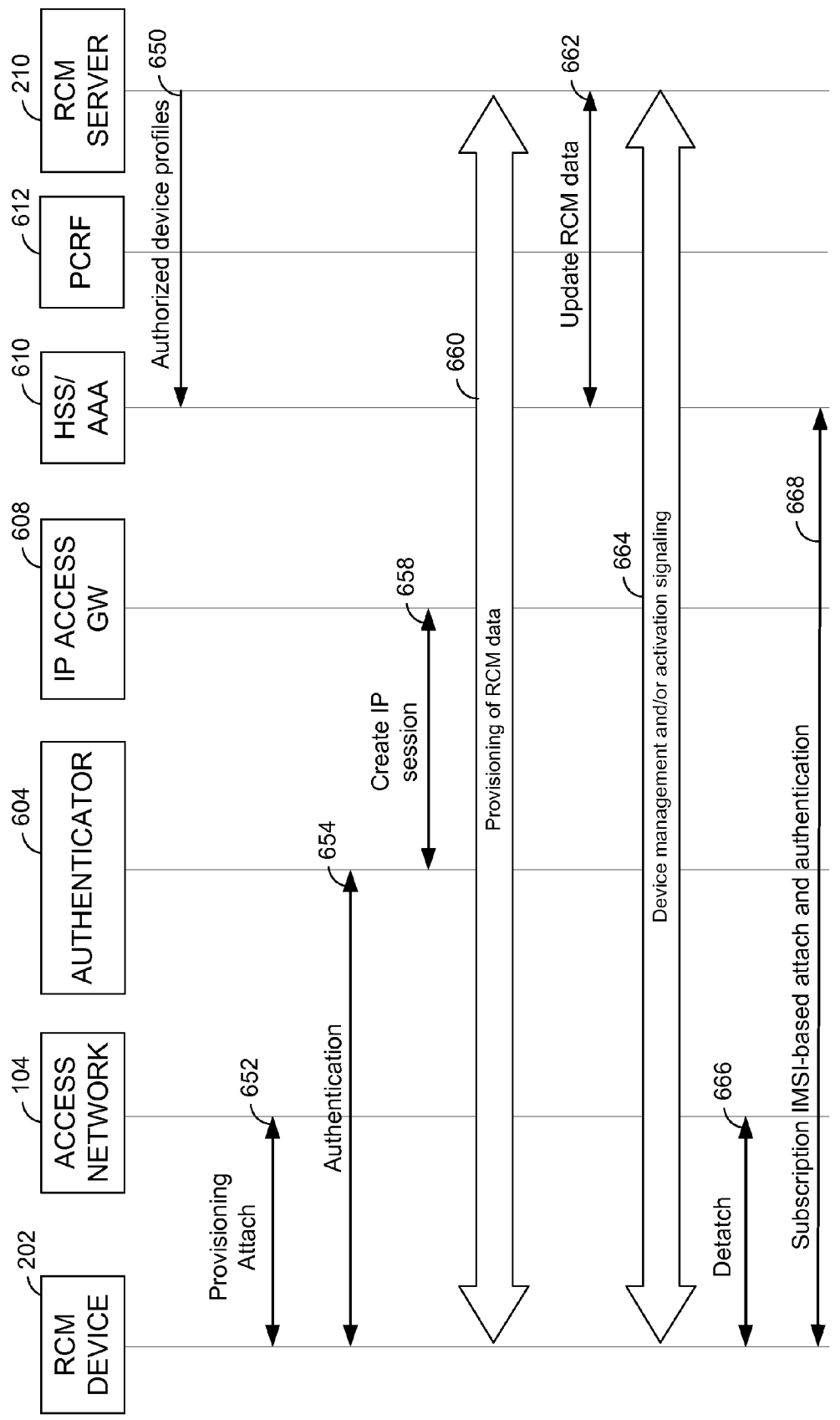
FIG. 6 shows a call flow diagram which may be included an example remote credential management system.

FIG. 6 shows a call flow diagram which may be included an example remote credential management system. The call flow diagram shown in FIG. 6 includes some of the entities which may be included in a wireless communication system featuring remote credential management. The entities shown in FIG. 6 include the RCM capable device 202, the access network 104 (e.g., UTRAN or E-UTRAN), and authenticator 604, and IP access gateway 608, and HSS/HAA 610, a policy charging and rules function 612, and a RCM server 210.

The call flow may begin with a message 650 transmitted from the RCM server 210 or a device vendor to the HSS/HAA 610. The message 650 may identify authorized device profiles associated with the credential provider. The authorized device profiles may include bootstrap information (such as a trusted public key or CA certificate) which may be associated with an RCM capable device or class of RCM capable devices. For example, the message 650 may identify a class of devices associated with a credential provider. As some specific examples, the message 650 may identify smart meters belonging to a utility company, smart phones associated with a service provider, or an e-book reader provided by an e-book distributor. The identification may be according to device identifiers, portion of device identifiers (e.g., ranges of identifiers), device class identifiers, and the like. The identifier information may also be stored in the RCM capable device 202 during manufacture or prior to delivery to a customer. The information may be stored in the RCM capable device 202 using a secure memory element.

At a later point in time, the RCM capable device 202 may transmit a message 652 to the access network 104. The message 652 may be an attach request for provisioning service. The attach request may be associated with a type. The message 652 may include an attach request of type associated with provisioning service. As one example, the attach request may include an information element including a value indicating the attach request is of a type associated with provisioning service. The message 652 may include device vendor information such as a unique device identifier, device class identifier, or the like. One example of a unique device identifier is the international mobile equipment identifier (IMEI). Another example of a unique device identifier is a mobile equipment identifier (MEID). The information included in the message 652 may be included in the information provided by the message 650.

The access network 104 may allow the RCM capable device 202 onto the network. For example, the access network 104, may determine that the message 652 is a provisioning type attach request. This may cause the access network 104 to preempt subscription authentication procedures and allow the RCM capable device 202 network access. The service provider may limit the access of the RCM capable device 202 to certain network services and/or locations. For example, the service provider may only allow the device to access the remote credential management server 210. In some implementations, the service provider may allocate a certain quality of service for the provisioning attach requests as compared to a quality of service for non-provisioning attach requests. For example, the service provider may allocate a lower quality of service (e.g., priority) for provisioning attach requests as compared to non-provisioning attach requests (e.g., from devices having previously provisioned credentials).

Once allowed onto the network, device authentication may be performed via authentication message 654. It should be noted that the authentication message 654 is to authenticate the device, not a subscription, as the device has not yet been provisioned with service information. The authentication message 654 may include transmitting the IMEI as well as the IMEI certificate information associated with the RCM capable device 202 to an authenticator 604. In some implementations the authenticator 604 may be a serving general packet radio service support node (SGSN) or a mobility management entity (MME). In some cdma2000 network implementations, the authenticator may be a packet data serving node (PDSN) or a HRPD service gateway (HSGW). If not already available, the authorized vendor specific device authentication information, such as associated with the RCM capable device 202 certificate authority (CA) certificate and profile may be obtained by the authenticator 604 through messaging with the HSS/AAA 610 or from another entity of the service provider network.

If the authentication fails, the call flow ends. As shown in FIG. 6 however, the authentication is successful. Message 658 between the authenticator 604 and the IP access gateway 606 may be transmitted. Examples of the IP access gateway 606 include a gateway general support node, gateway general packet radio service service node, or packet data network gateway.

The message 658 may generate an IP session for the RCM capable device 202 to access the RCM server 210 to obtain subscription credentials. In some implementations, the IP session may be authorized by messaging (not shown) between the IP access gateway and the policy charging rules function 412. The authorization may be based at least in part on the IMEI/MEID authorization for the device. In some implementations, the IP access gateway 606 may include device specific restricted IP filters to limit the network access of the RCM capable device 202. The IP filters may be established per device, per device class, per provisioning attachment or configured the same at the IP gateway for all devices requesting provisioning service.

The RCM capable device 202 may now communicate with the RCM server 210. Message 660 may be transmitted between the RCM capable device 202 and the RCM server 210 to provision the subscription credentials for the RCM capable device 202. In some implementations, the RCM capable device 202 may be associated with a valid credential. If the RCM server 210 can identify this credential, the provisioning may be achieved without additional messaging with the RCM capable device 202. However, as described above, in a non-subscriber situation, subscription offers may be presented to the RCM capable device 202. The message 660 may include offer information, offer response information, and the like. It should be noted, the communication between the RCM capable device 202 in the RCM server 210 is mutually authenticated, IP-based, and secured.

The message 660 may result in the successful provisioning of credentials for the RCM capable device 202. In such circumstances, the remote credential management data may also be updated with the HSS/AAA 610 indicating the valid subscription credential for the RCM capable device 202. The update may occur via a message 662.

Message 664 may be transmitted to accomplish additional device management and/or activation. For example, the subscription may be provided to the RCM capable device 202, but additional information may be needed for the device to access a particular network. This information may be transmitted to the RCM capable device 202 via the messaging 664.

The RCM capable device 202 may now have a valid subscription credential and any additional management or activation information needed to access the network. Message 666 may be transmitted between the RCM capable device 202 and the access network 104 to detach the RCM capable device 202. Although not shown, the detach may also cause the IP session created by message 658 to close. Message 668 may be transmitted to attach the RCM capable device 202 the network using the provisioned subscription credentials.

Accordingly, as shown, the RCM capable device 202 initially having no valid subscription credentials may provision subscription credentials using cellular connectivity by providing device vendor authentication information stored on the RCM capable device 202.

Figure 7:
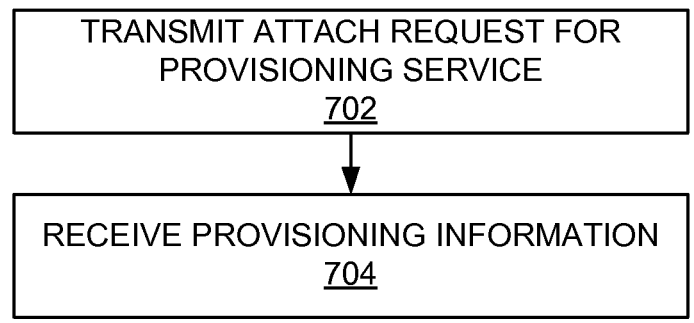
FIG. 7 shows a process flow diagram for an example method of obtaining provisioning information via a service provider network.

FIG. 7 shows a process flow diagram for an example of a method of obtaining provisioning information via a service provider network. The process may be performed in whole or in part by the devices described herein, such as that shown in FIG. 3 above or FIG. 8 below. In some implementations, the process may be implemented in a STA such as a remote credential management capable device.

The process begins at block 702 where an attach request may be transmitted via the service provider network for provisioning service. The attach request may include device vendor information such as the bootstrap information discussed above. In some implementations a challenge request to authenticate a device may be received. In such implementations, a challenge response based at least in part on device vendor information (e.g., credentials) may be transmitted. At block 704, provisioning information may be received from the service provider network upon authentication of the device vendor information. The signals transmitted and/or received may be similar to those shown in the call flows of FIG. 6.

Figure 8:
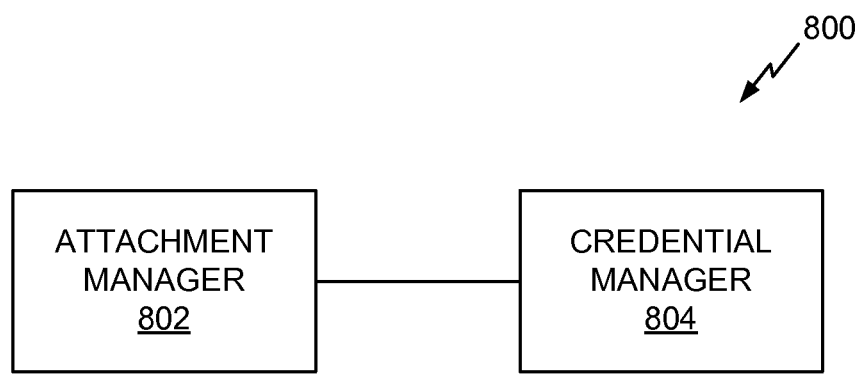
FIG. 8 shows a functional block diagram for an example of a wireless network communication apparatus.

FIG. 8 shows a functional block diagram for a wireless network communication apparatus. Those skilled in the art will appreciate that a wireless network communication apparatus may have more components than the simplified wireless network communication apparatus 800 shown in FIG. 8. The wireless network communication apparatus 800 shown includes only those components useful for describing some prominent features of implementations within the scope of the claims. The wireless network communication apparatus 800 may include an attachment manager 802 and a credential manager 804.

In some implementations, the attachment manager 802 may be configured to transmit an attach request via the service provider network for provisioning service. The attach request may include device vendor information having a unique identifier for the wireless network communication apparatus 800. The attachment manager 802 may include one or more of a programmable chip, a processor, a memory, an antenna, and a transmitter. In some implementations, means for transmitting an attach request for provisioning service may include the attachment manager 802.

In some implementations, the subscription manager 804 may be configured to receive subscription information from the service provider network. The subscription manager 804 may include one or more of a receiver, an antenna, a signal processor, and a memory. In some implementations, means for receiving provisioning information may include the subscription manager 804.

Figure 9:
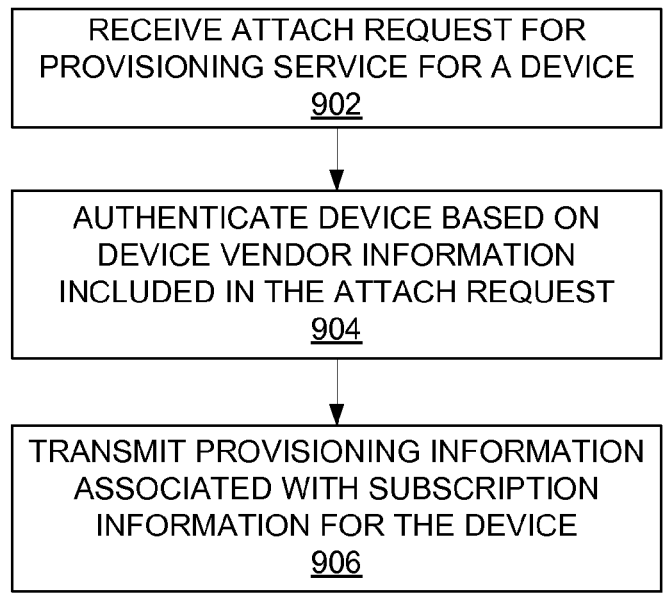
FIG. 9 shows a process flow diagram for an example method of providing provisioning information via a service provider network.

FIG. 9 shows a process flow diagram for an example method of providing provisioning information via a service provider network to a device. The process may be performed in whole or in part by the devices described herein, such as that shown in FIG. 3 above or FIG. 10 below. In some implementations, the process may be implemented in a remote credential management server.

The process begins at block 902 where an attach request for provisioning service is received via the service provider network from the device. The attach request may include device vendor information as discussed above. At block 904, the device is authenticated based at least in part on device vendor information. At block 906, provisioning information associated with a subscription is transmitted upon determining the device is authenticated.

Figure 10:
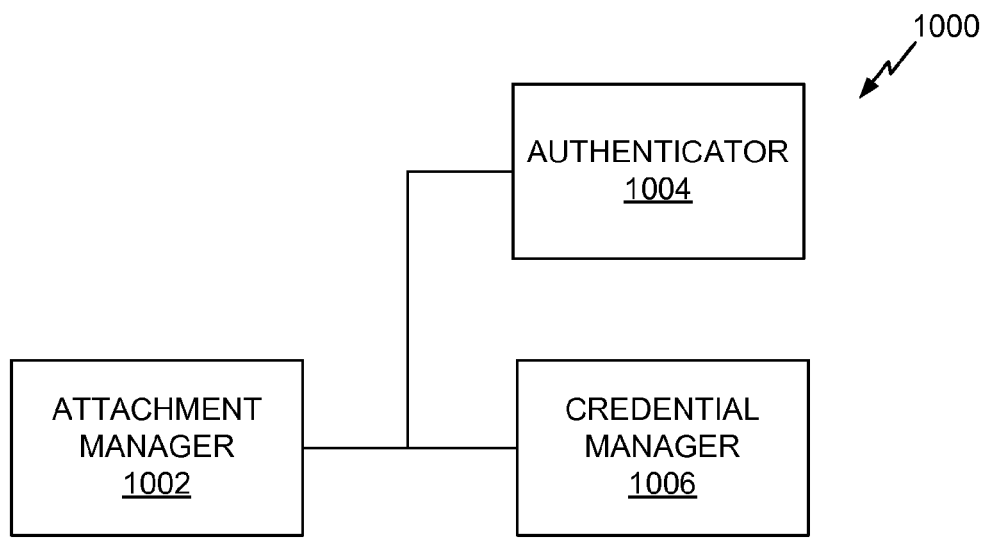
FIG. 10 shows a functional block diagram for an example of another wireless network communication apparatus.

FIG. 10 shows a functional block diagram for an example of another wireless network communication apparatus. Those skilled in the art will appreciate that a wireless network communication apparatus may have more components than the simplified wireless network communication apparatus 1000 shown in FIG. 10. The wireless network communication apparatus 1000 shown includes only those components useful for describing some prominent features of implementations within the scope of the claims. The wireless network communication apparatus 1000 may include an attachment manager 1002, an authenticator 1004, and a credential manager 1006.

In some implementations, the attachment manager 1002 may be configured to receive an attach request via the service provider network from the device for provisioning service, the attach request including device vendor information having a unique identifier for the device. The attachment manager 1002 may include one or more of a receiver, an antenna, a programmable chip, a processor, a memory, and a network interface. In some implementations, means for receiving an attach request may include the attachment manager 1002.

In some implementations, the authenticator 1004 may be configured to authenticate the device based at least in part on the device vendor information. The authenticator 1004 may include one or more of a data network interface, a comparator, a certificate processor, a processor, and a memory. In some implementations, means for authenticating the device may include the authenticator 1004.

In some implementations, the credential manager 1006 may be configured to cause the transmission of provisioning information associated with a subscription upon authentication of the device. The credential manager 1006 may include one or more of a transmitter, an antenna, a memory, a processor, a signal generator, and a credential store. In some implementations, means for transmitting provisioning information may include the credential manager 1006.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of obtaining provisioning information via a service provider network for a device, the method comprising:
transmitting, via the service provider network, an attach request for provisioning service, the attach request including device vendor information having a unique identifier for the device;
receiving a request for subscription authentication from the service provider network;
transmitting a subscription challenge response based at least in part on a predetermined credential shared by multiple devices configured to obtain provisioning information for each of the multiple devices using the shared predetermined credential via the service provider network, the multiple devices including the device; and
receiving provisioning information from the service provider network upon authentication of the device vendor information and the subscription challenge response.

2. The method of claim 1, wherein the attach request comprises a provisioning type.

3. The method of claim 2, wherein the provisioning type for the attach request is included in an information element of the attach request.

4. The method of claim 1, further comprising:
receiving a challenge request to authenticate the device vendor information; and
transmitting a challenge response based at least in part on device vendor information.

5. The method of claim 1, further comprising:
obtaining a session key, the session key based at least in part on the device vendor information; and
securing communications between the device and the service provider network based at least in part on the session key.

6. The method of claim 1, further comprising:
detaching from the service provider network upon receipt of the provisioning information; and
obtaining service based at least in part on the received provisioning information.

7. The method of claim 1, wherein the device vendor information further includes an encryption certificate associated with a vendor of the device.

8. The method of claim 1, wherein the unique identifier for the device comprises at least one of an international mobile equipment identifier and a mobile equipment identifier.

9. The method of claim 1, wherein the service provider network comprises a cellular network.

10. An apparatus for obtaining provisioning information via a service provider network, the apparatus comprising:
an attachment manager configured to transmit, via the service provider network, an attach request for provisioning service, the attach request including device vendor information having a unique identifier for the apparatus;
a challenge request receiver configured to receive a subscription challenge request to authenticate a subscription for the apparatus; and
a challenge response transmitter configured to transmit a subscription challenge response based at least in part on a predetermined credential shared by multiple devices configured to obtain provisioning information for each of the multiple devices using the shared predetermined credential via the service provider network, the multiple devices including the apparatus; and
a credential manager configured to receive provisioning information from the service provider network upon authentication of the device vendor information and the subscription challenge response.

11. The apparatus of claim 10, wherein the attach request comprises a provisioning type.

12. The apparatus of claim 11, wherein the provisioning type for the attach request is included in an information element of the attach request.

13. The apparatus of claim 10, further comprising:
wherein the challenge request receiver is configured to receive a device challenge request to authenticate the device vendor information; and
wherein the challenge response transmitter is configured to transmit a device challenge response based at least in part on device vendor information.

14. The apparatus of claim 10, further comprising:
a session key manager configured to obtain a session key based at least in part on the device vendor information; and
a secure communication module configured to securely communicate with the service provider network based at least in part on the session key.

15. The apparatus of claim 10, wherein the attachment processor is further configured to:
detach from the service provider network upon receipt of the provisioning information; and
obtaining service based at least in part on the received provisioning information.

16. The apparatus of claim 10, wherein the device vendor information further includes an encryption certificate associated with a vendor of the apparatus.

17. The apparatus of claim 10, wherein the unique identifier for the apparatus comprises at least one of an international mobile equipment identifier and a mobile equipment identifier.

18. The apparatus of claim 10, wherein the service provider network is a cellular network.

19. An apparatus for obtaining provisioning information via a service provider network, the apparatus comprising:
means for transmitting, via the service provider network, an attach request for provisioning service, the attach request including device vendor information having a unique identifier for the apparatus;
means for receiving a challenge request to authenticate a subscription for the apparatus; and
means for transmitting a challenge response based at least in part on a predetermined credential shared by multiple devices configured to obtain provisioning information for each of the multiple devices using the shared predetermined credential via the service provider network, the multiple devices including the apparatus; and
means for receiving provisioning information from the service provider network upon authentication of the device vendor information and the subscription challenge response.

20. A non-transitory computer readable storage medium comprising instructions executable by a processor of an apparatus, the instructions causing the apparatus to:
transmit, via a service provider network, an attach request for provisioning service, the attach request including device vendor information having a unique identifier for the apparatus;
receive a request for subscription authentication from the service provider network;
transmit a challenge response based at least in part on a predetermined credential shared by multiple devices configured to obtain provisioning information for each of the multiple devices using the shared predetermined credential via the service provider network, the multiple devices including the apparatus; and
receive provisioning information from the service provider network upon authentication of the device vendor information and the subscription challenge response.

21. A method of providing provisioning information via a service provider network to a device, the method comprising:
receiving an attach request from the device via the service provider network for provisioning service, the attach request including device vendor information having a unique identifier for the device;
transmitting a request for subscription authentication from the service provider network;
receiving a subscription challenge response;
authenticating the device based at least in part on the device vendor information;
determining if the subscription challenge response is associated with a subscription based at least in part on a predetermined credential shared by multiple devices configured to obtain provisioning information for each of the multiple devices using the shared predetermined credential via the service provider network, the multiple devices including the device; and
transmitting provisioning information associated with the subscription upon determining the device is authenticated and associated with the subscription.

22. The method of claim 21, wherein the attach request comprises a provisioning type.

23. The method of claim 22, wherein the provisioning type for the attach request is included in an information element of the attach request.

24. The method of claim 21, further comprising:
transmitting a device challenge request to authenticate the device;
receiving a device challenge response; and
determining if the device challenge response is associated with the subscription based at least in part on device vendor information, wherein transmitting provisioning information associated with the subscription is further based upon determining the device challenge response is associated with the subscription.

25. The method of claim 21, further comprising:
generating a session key, the session key based at least in part on device vendor information; and
securing communications between the device and the service provider network based at least in part on the session key.

26. The method of claim 21, wherein the device vendor information further comprises an encryption certificate associated with a vendor of the device.

27. The method of claim 21, wherein the unique identifier for the device comprises at least one of an international mobile equipment identifier for the device and a mobile equipment identifier for the device.

28. The method of claim 21, wherein the service provider network is a cellular network.

29. The method of claim 21, further comprising, upon determining the device is unauthenticated:
obtaining a subscription offer from a credential provider;
transmitting the subscription offer to the device;
receiving a message indicating acceptance of the subscription offer; and
transmitting provisioning information based on the accepted subscription offer.

30. The method of claim 21, further comprising detaching the device from the service provider network upon transmission of the provisioning information.

31. An apparatus for providing provisioning information via a service provider network for a device, the apparatus comprising:
- an attachment manager configured to receive an attach request from the device via the service provider network for provisioning service, the attach request including device vendor information having a unique identifier for the device;
- a challenge request circuit configured to cause transmission of a subscription challenge request to authenticate a subscription for the device;
- a challenge response circuit configured to receive a subscription challenge response;
- an authenticator configured to:
  - authenticate the device based at least in part on the device vendor information; and
  - determine if the subscription challenge response is associated with a subscription based at least in part on a predetermined credential shared by multiple devices configured to obtain provisioning information for each of the multiple devices using the shared predetermined credential via the service provider network, the multiple devices including the device; and
- a credential manager configured to cause the transmission of provisioning information associated with the subscription upon determining the device is authenticated and associated with the subscription.

32. The apparatus of claim 31, wherein the attach request comprises a provisioning type.

33. The apparatus of claim 32, wherein the provisioning type for the attach request is included in an information element of the attach request.

34. The apparatus of claim 31,
- wherein the challenge request circuit is configured to cause transmission of a device challenge request to authenticate the device,
- wherein the challenge response circuit is configured to receive a device challenge response,
- wherein the authenticator is further configured to determine if the device challenge response is associated with the subscription based at least in part on device vendor information, and
- wherein the credential manager is further configured to cause the transmission of provisioning information associated with the subscription upon determining the device challenge response is associated with the subscription.

35. The apparatus of claim 31, further comprising:
- a session key generator configured to generate a session key based at least in part on the device vendor information; and
- a secure communication module configured to secure communication between the service provider network and the device based at least in part on the session key.

36. The apparatus of claim 31, wherein the device vendor information further includes an encryption certificate associated with a vendor of the device.

37. The apparatus of claim 31, wherein the unique identifier for the device includes at least one of an international mobile equipment identifier for the device and a mobile equipment identifier for the device.

38. The apparatus of claim 31, wherein the service provider network is a cellular network.

39. The apparatus of claim 31, further comprising a subscription offer circuit configured to, upon determining the device is unauthenticated:
- obtain a subscription offer from a credential provider;
- transmit the subscription offer to the device;
- receive a message indicating acceptance of the subscription offer; and
- transmit provisioning information based on the accepted subscription offer.

40. The apparatus of claim 31, wherein the attachment manager is further configured to detach the device from the service provider network upon transmission of the provisioning information.

41. An apparatus for providing subscription information via a service provider network to a device, the apparatus comprising:
- means for receiving an attach request from the device via the service provider network for provisioning service, the attach request including device vendor information having a unique identifier for the device;
- means for transmitting a subscription challenge request to authenticate a subscription for the device;
- means for receiving a subscription challenge response;
- means for authenticating the device based at least in part on device vendor information and for determining if the subscription challenge response is associated with a subscription based at least in part on a predetermined credential shared by multiple devices configured to obtain provisioning information for each of the multiple devices using the shared predetermined credential via the service provider network, the multiple devices including the device; and
- means for transmitting provisioning information associated with the subscription upon determining the device is authenticated and associated with the subscription.

42. A non-transitory computer readable storage medium comprising instructions executable by a processor of an apparatus, the instructions causing the apparatus to:
- receive an attach request from a device via the service provider network for provisioning service, the attach request including device vendor information having a unique identifier for the device;
- transmit a request for subscription authentication from the service provider network;
- receive a subscription challenge response from the device;
- authenticate the device based at least in part on device vendor information;
- determine if the subscription challenge response is associated with a subscription based at least in part on a predetermined credential shared by multiple devices configured to obtain provisioning information for each of the multiple devices using the shared predetermined credential via the service provider network, the multiple devices including the device; and
- transmit provisioning information associated with the subscription upon determining the device is authenticated and associated with the subscription.

* * * * *